United States Patent [19]
Kolk et al.

[11] Patent Number: 4,742,785
[45] Date of Patent: May 10, 1988

[54] PLANTING MACHINE WITH GROUND-CONDITIONING DRIVE

[76] Inventors: Howard A. Kolk, 155 W. 39th St.; Robert D. Kolk, 28 W. 39th St., both of Holland, Mich. 49423

[21] Appl. No.: 904,928

[22] Filed: Sep. 8, 1986

[51] Int. Cl.⁴ .............................................. A01C 11/00
[52] U.S. Cl. ...................................... 111/3; 74/13; 111/52
[58] Field of Search .......................... 111/2, 3, 52–66, 111/71, 77, 81; 172/443, 451, 677; 74/11, 13–15; 280/476 R, 476 A, 483, 486, 489, 492, 493; 180/53.6, 53.8

[56] References Cited

U.S. PATENT DOCUMENTS

| | | | |
|---|---|---|---|
| 251,879 | 1/1882 | Hazelrigg | 111/54 |
| 350,964 | 10/1886 | Atkinson et al. | 111/77 |
| 367,743 | 8/1887 | Cumming | 111/71 |
| 370,301 | 9/1887 | Alston et al. | 111/71 |
| 690,314 | 12/1901 | Noren et al. | 111/57 |
| 1,368,486 | 2/1921 | Chaney | 111/3 |
| 2,230,643 | 2/1941 | Hershey | 111/3 |
| 2,234,778 | 3/1941 | Redwood | 111/81 |
| 2,981,213 | 4/1961 | O'Neil | 111/64 |
| 4,455,950 | 6/1984 | Pretzer | 111/3 |

FOREIGN PATENT DOCUMENTS

| | | | |
|---|---|---|---|
| 554060 | 1/1957 | Belgium | 111/77 |
| 902524 | 8/1962 | United Kingdom | 111/3 |

Primary Examiner—James R. Feyrer
Attorney, Agent, or Firm—Glenn B. Morse

[57] ABSTRACT

A planting machine has a ground-conditioning wheel ahead of the planting mechanism. This wheel normally carries a portion of the weight of the machine. The traction thus established is utilized to generate power for the planting mechanism as the machine is moved forward. Power is transferred to the planting mechanism by a sequence of chain drives having replaceable sprockets of various diameters to establish different spacing of planting positions along the row.

1 Claim, 4 Drawing Sheets

PLANTING MACHINE WITH GROUND-CONDITIONING DRIVE

BACKGROUND OF THE INVENTION

Planting machines are in very wide use in many sections of agriculture. Some are adapted to plant seeds, and others have mechanism capable of handling seedling plants. Various forms of these machines have found applications in the production of almost all forms of farm produce, and in reforestation projects. The planting of seeds is normally handled by an automatic feeding mechanism supplied by a hopper, and seedling plants are usually hand-fed into a mechanical system that deposits the plants properly in spaced relationship. These machines either have arrangements for opening a furrow ahead of the planting mechanism, and closing it afterward, or are equipped to stab an opening in the ground in which the seed or seedling is deposited. Machines constructed along these lines are described in U.S. Pat. Nos. 3,125,044; 3,728,805; and 4,290,373. These patents are all owned by the assignee of the present application.

A problem that is always present in the design of these machines is the incorporation of sufficient flexibility of spacing of the planting operations to accommodate a wide variety of plant requirements. Spacing is normally controlled by the rate of operation of the planting mechanism with respect to the forward speed of the vehicle to which the machine is attached. Another problem has arisen in the planting of seedlings. Deposit of these small and delicate plants along uneven ground will frequently distort the final position of the plants, and impair their ability to survive. Even where furrows are opened and closed by the machine, the presence of clods of small hills adjacent to the furrows can easily distort the plants placement as the furrow is closed. Another undesireable variation in the position and spacing of the plants arises from the ground slippage of the usual rimmed wheels that close the furrows behind the planting position, and are also used to drive the mechanism. The peripheral configuration of these wheels is predetermined by their furrow-closing functions, which is somewhat impractical for the generation of traction. The present invention is directed at the solution of these problems.

SUMMARY OF THE INVENTION

The power necessary to drive the planting mechanism of this machine is obtained from a ground-engaging wheel carrying at least part of the weight of machine, and disposed directly ahead of the planting row. This wheel is of sufficient width to condition the ground to a uniform level ahead of the furrow-opening devices so that the ground conditions along the planting row are uniform and level. The use of this wheel as a power source also permits the periphery of the wheel to be adapted for the production of traction, without regard to other requirements. In fact, the desireable configuration for the production of good traction seems ideally suited for the ground-conditioning function as well. This invention also provides a special arrangement for interconnecting the machine with the towing vehicle so that the functioning of the driving and conditioning wheel is unimpaired by exterior forces.

DESCRIPTION OF THE PREFERRED EMBODIMENTS

Figure 1:
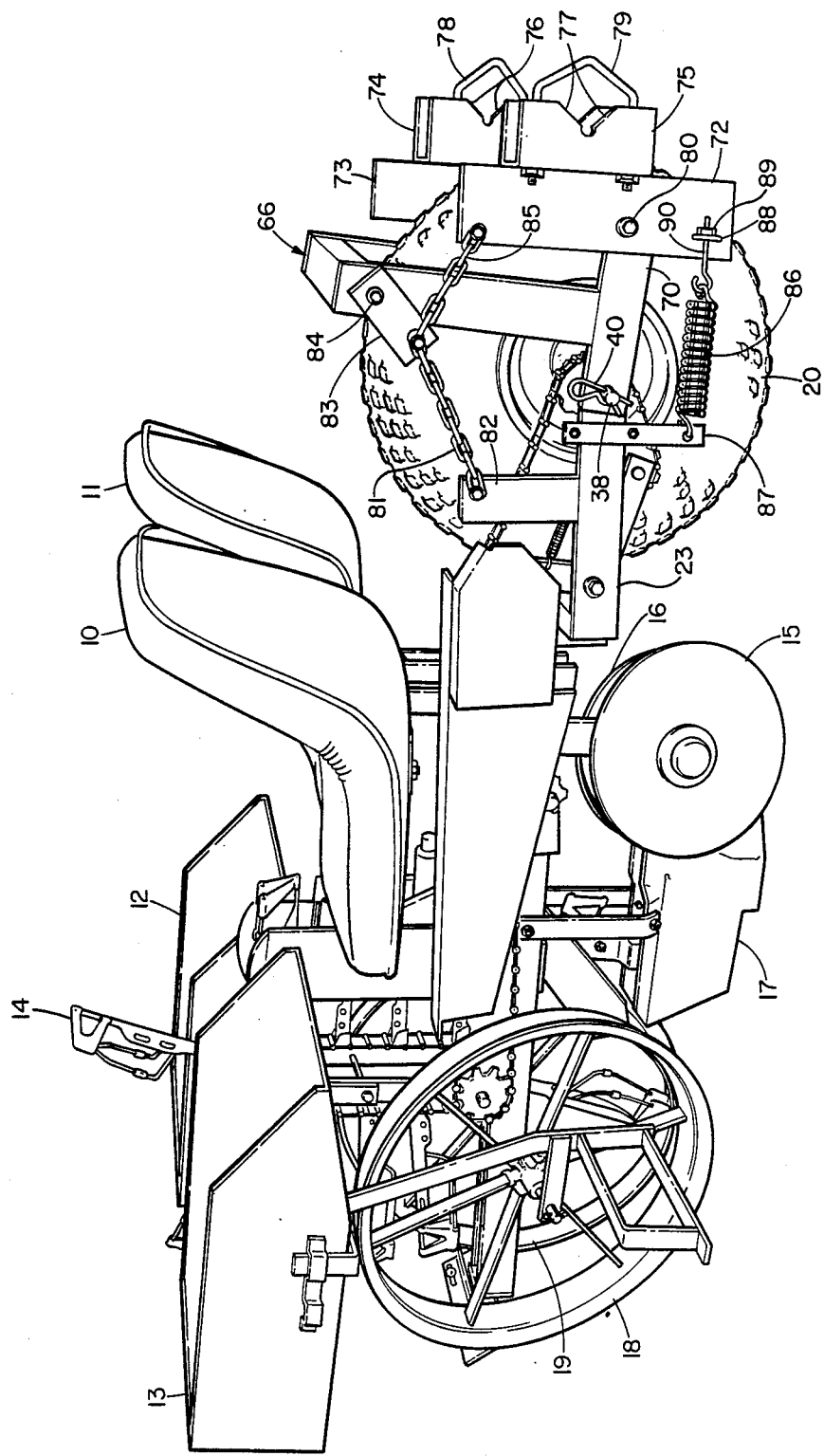
FIG. 1 is a side elevation of a planting machine embodying the present invention.

Referring to FIG. 1, the illustrated machine is adapted for attachment to a tractor (not shown) which will function as a towing vehicle. The movement of the machine along the planting row is from left to right, as shown in FIG. 1. The two seats 10 and 11 receive operators who will be facing to the rear, and removing seedlings from the trays shown at 12 and 13, and placing them in one of the arms 14 of the planting mechanism. The planting mechanism itself forms no part of the present invention. A number of arms 14 are usually mounted on a chain, which moves them from a receiving position shown in FIG. 1 to a planting position directly below. As the machine proceeds along its path forming a planting row, the discs 15 and 16 open a furrow ahead of the shield housing 17, within which the plants are inserted in the ground by the mechanism. This is followed by the closing of the furrow by the rimmed wheels 18 and 19. All of the structure described to this point is conventional.

Figure 4:
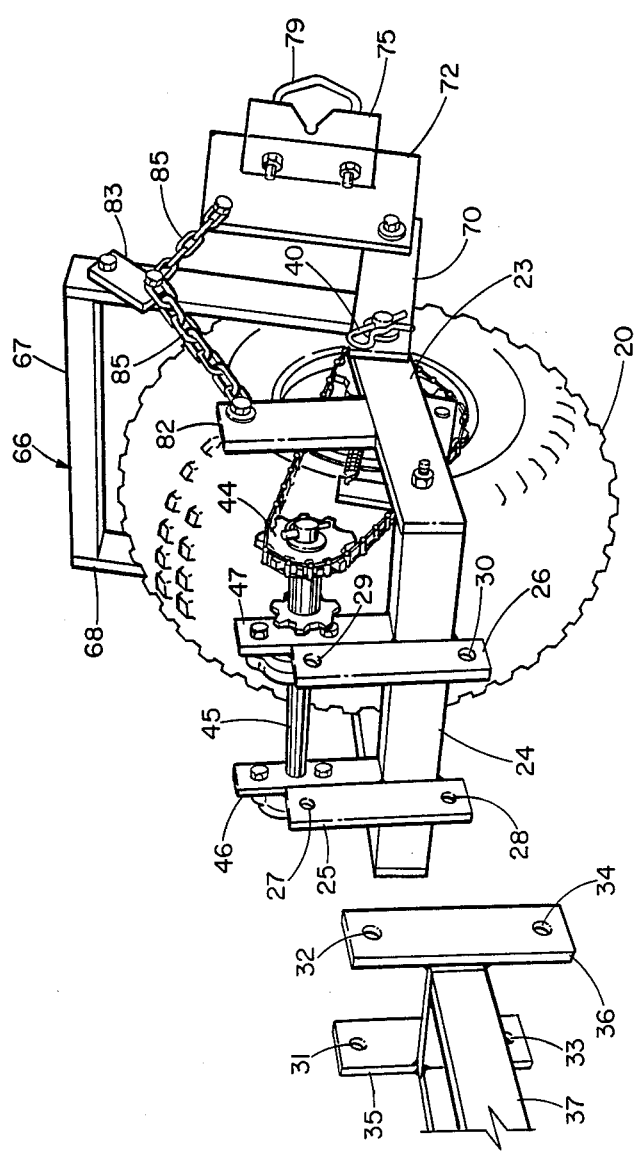
FIG. 4 is a perspective view from the rear quarter showing the ground-conditioning wheel and its associated fork frame and the hitch structure.

The forward portion of the machine is supported by the ground-engaging wheel 20. This is a low-pressure air wheel with a wide enough track to condition the ground over the full width of the planting row. The studded surface of the wheel provides good traction, and breaks up clods of earth. This wheel is carried by a fork frame generally indicated at 21, and including the side members 22 and 23 and the interconnecting front member 24. The vertical bars 25 and 26 are welded to the rear of the member 24, and are provided with holes as shown at 27–30 for receiving bolts traversing the holes 31–34 of the similar vertical bars 35 and 36 welded to the front of the main frame 37 of the machine. FIG. 4 shows the fork frame and its associated structure detached from the main frame. When the unit is attached to the main frame, the fork frame becomes structurally a part of the main frame.

A shaft 38 is received in appropriate holes in the forward portions of the members 22 and 23 of the fork frame. This shaft traverses the wheel 20, which has conventional internal bearings (not shown). A collar 39 is received over the shaft 38 and is bolted to the hub of the wheel 20 to function as a power take-off for the chain system that transfers this power over the the planting mechanism. Snap-on pins as shown at 40 and 41 maintain the shaft 38 in position on the fork frame 21. The sprocket 42 is intregral with the collar 39, and receives the chain 43. This chain also engages the sprocket 44 mounted on the shaft 45 supported by the bars 46 and 47 welded to the member 24 of the fork frame. These bars are also preferably welded at their junction with the bars 25 and 26 to form a structurally continuous plate.

Figure 2:
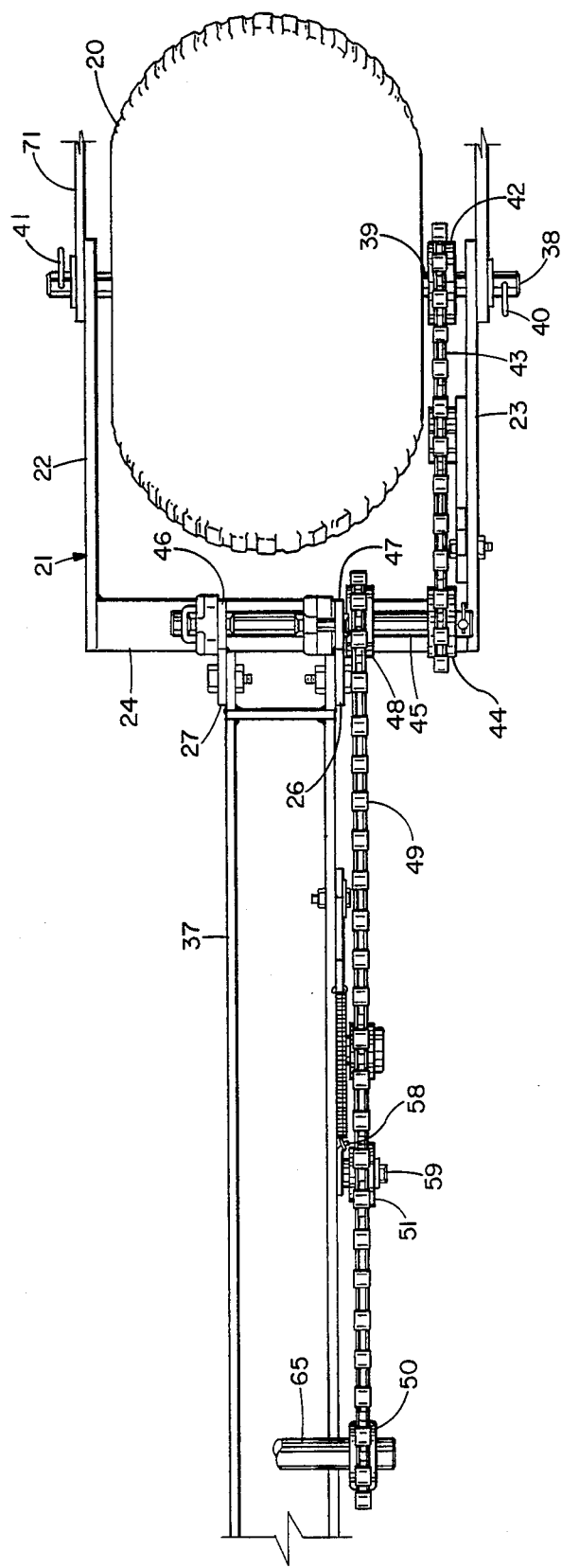
FIG. 2 is a top view showing the ground-conditioning wheel and the chain drive system for transferring power from this wheel to the planting mechanism.
Figure 3:
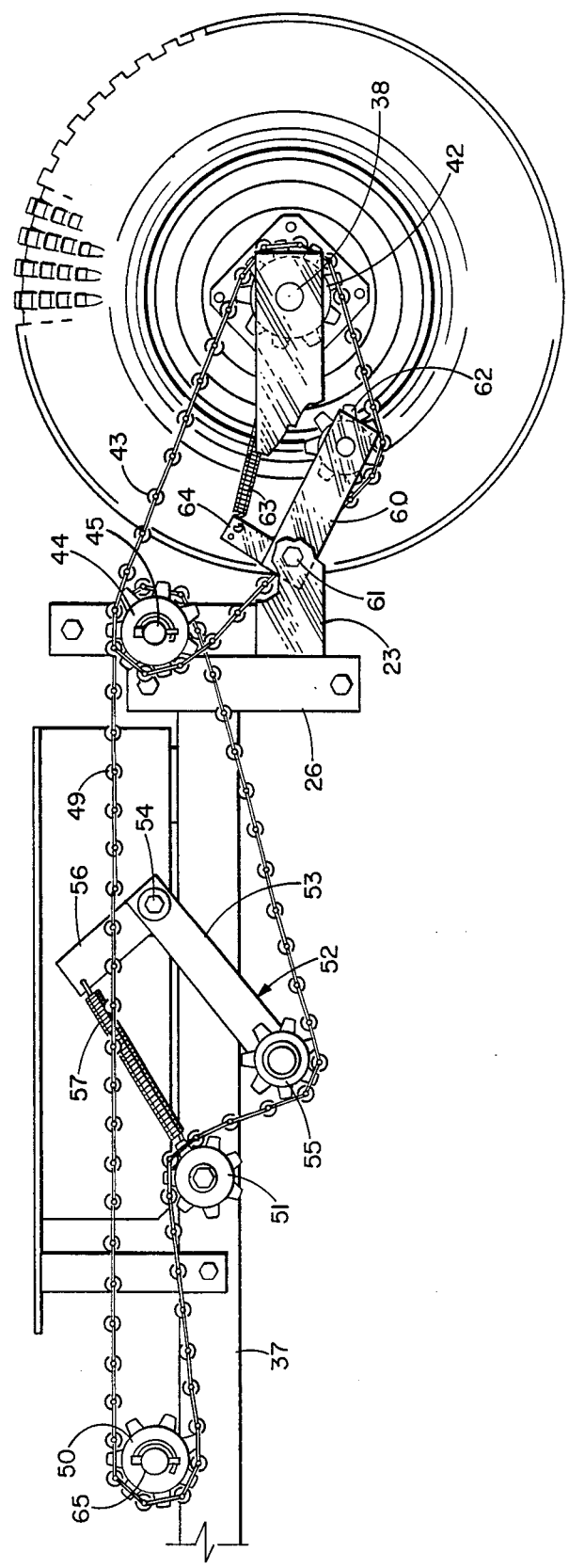
FIG. 3 is a side elevation of the portion of the machine shown in FIG. 2.

The sprocket 48 is also secured to the shaft 45, so that torque from the sprocket 44 is delivered through the sprocket 48 to the chain 49. This chain ultimately drives the sprocket 50, which is associated with the planting mechanism. The idler sprocket 51 is secured to the main frame 37 on a fixed axis, and establishes the course of the chain 49 so that the chain tightener 52 can function properly. The tightener is essentially a radius arm 53 pivotally mounted at 54 on the main frame 37, and carries the sprocket 55 at its outer extremity. The crank arm 56 is fixed with respect to the arm 53, and the spring 57 biases the chain tightener 52 to generate the appropriate tension in the chain 49. The fixed terminal of the spring 57 can be a tab as shown at 58 in FIG. 2 secured by the bolt 59 supporting the sprocket 51. A similar chain tightener 60 is pivoted to the member 23 of the fork frame on the bolt 61. The sprocket 62 is carried by this tightener, and engages the chain 43. The spring 63 extends between the crank arm 64 of the tightener to a convenient point of attachment on the member 23 of the fork frame, resulting is a biasing action tending to rotate the tightener clockwise, as shown in FIG. 3 to maintain a predetermined degree of tension in the chain 43. The primary purpose of the two chain tighteners is to make available a sufficient amount of slack in the chains so that they can be disengaged readily, and permit the removal and replacement of the various sprockets. The sprockets 44 and 50 are held axially in place by disengageable devices such that they are easily removed, permitting replacement by sprockets of other diameters. This arrangement makes it possible to provide a wide variety of speed ratios between the ground-engaging wheel, and the rate of rotation of the shaft 65 driving the planting mechanism.

Referring to FIG. 1, the hitch structure has a "U"-shaped member 66 including the top cross bar 67 and the side arms 68 and 69. The lower extremities of the latter are welded to links 70 and 71, which pivot on the shaft 38. These links are also pivoted to the generally vertical plates 72 and 73, to which the channel-shaped brackets 74 and 75 are respectively welded. These have "V"-shaped notches as shown at 76 and 77 for receiving a corner of a square tube carried by the tractor, commonly known as a "tool bar". "U"-bolts 78 and 79 maintain the engagement of the device with this tool bar.

The links 70 and 71 are pivotally connected to the plates 72 and 73 on bolts as shown at 80 in FIG. 1. The result of this arrangement is that the planting vehicle is connected to the tractor with a freedom of vertical movement accompanied by oscillation of the links 70 and 71, and by corresponding oscillation of the "U" structure 66. A chain 81 extends from the vertical arm 82 welded to the side fork frame member 23, and to the link plate 83 pivotally connected to the member 66 at the bolt 84. A second chain 85 extends from the link plate 83 to a point of connection on the plate 72. As the tractor may elevate the hitch structure to lift the machine clear of the ground, the pivoting of the links 70 and 71 is limited by the presence of the chains. This permits the entire machine to be elevated, rather than merely one end of it. The tool bar of the tractor may extend laterally far enough to carry several of these machines, and the passage of the tractor over rough ground may cause the tool bar to assume considerable inclination with respect to the horizontal. The link connection, together with the resilient flexibility of the member 66, permits this sort of movement without interferring seriously with the bearing of the wheel 20 with the ground. These chain assemblies are provided on the opposite sides of the machine. A portion of the weight of the front end of the machine shown in FIG. 1 can be transferred to the fixed portion of the hitch mechanism through the use of springs as shown at 86 extending from the lower end of the arms 87 bolted to the fork frame to the brackets 88 welded to the side plates 72 and 73. This structure should also be provided on opposite sides of the vehicle, with the tension of the springs 86 being adjusted by appropriate adjustment of the nuts 89 on the eye-bolts 90 forming the spring connections.

We claim:

1. A planting machine including a main frame, planting means mounted on said main frame, and drive means for said planting means, said machine including means for establishing a planting path, wherein the improvement comprises:

hitch means adapted for connection to a powered vehicle, and link means pivotally connected to said hitch means and to said machine on parallel horizontal axes of articulation, and also including means limiting said articulation;

ground-engaging wheel means mounted on said main frame ahead of said planting means with respect to said path, and adapted to support at least a portion of the weight of said machine, said wheel means having a width selected to engage and condition the ground ahead of said path over a track extending on opposite sides of a line of planting established by said planting means;

a fork frame secured to said main frame and carrying said ground-engaging wheel means, wherein said limiting means includes an upwardly extending arm on said link means and flexible tension-transmitting means connecting the upper extremity of said link means arm and said hitch means at a position above said link means; and an upwardly-extending arm on said fork frame and flexible tension-transmitting means connecting the upper extremities of said fork frame arm and said link means arm.

* * * * *